United States Patent
Sato et al.

(10) Patent No.: US 12,241,875 B2
(45) Date of Patent: Mar. 4, 2025

(54) METHOD AND FACILITY FOR COLLISION PERFORMANCE EVALUATION TEST FOR METAL SHEET MATERIAL FOR AUTOMOBILE BODY

(71) Applicant: JFE STEEL CORPORATION, Tokyo (JP)

(72) Inventors: Kentaro Sato, Tokyo (JP); Takayuki Futatsuka, Tokyo (JP); Tomohiro Sakaidani, Tokyo (JP); Shinsuke Komine, Tokyo (JP); Yoshiyasu Kawasaki, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 682 days.

(21) Appl. No.: 17/311,236

(22) PCT Filed: Dec. 16, 2019

(86) PCT No.: PCT/JP2019/049189
§ 371 (c)(1),
(2) Date: Jun. 4, 2021

(87) PCT Pub. No.: WO2020/129903
PCT Pub. Date: Jun. 25, 2020

(65) Prior Publication Data
US 2022/0018747 A1    Jan. 20, 2022

(30) Foreign Application Priority Data
Dec. 17, 2018    (JP) .................................. 2018-235767

(51) Int. Cl.
*G01N 3/20*     (2006.01)
*G01N 3/04*     (2006.01)
(Continued)

(52) U.S. Cl.
CPC .................. *G01N 3/20* (2013.01); *G01N 3/24* (2013.01); *G01N 3/307* (2013.01); *G01N 3/04* (2013.01);
(Continued)

(58) Field of Classification Search
CPC ............ G01N 3/20; G01N 3/24; G01N 3/307; G01N 3/04; G01N 3/068; G01N 2203/001;
(Continued)

(56) References Cited

U.S. PATENT DOCUMENTS 8,606,532 B2    12/2013 Hiwatashi et al.
10,156,177 B2 *  12/2018 Butler ...................... F01N 13/18
(Continued)

FOREIGN PATENT DOCUMENTS

CN    108956322 A    12/2018
CN    216632080 U  *  5/2022
(Continued)

OTHER PUBLICATIONS

Jan. 27, 2022 Search Report issued in European Patent Application No. 19898324.9.
(Continued)

*Primary Examiner* — Jonathan M Dunlap
(74) *Attorney, Agent, or Firm* — Oliff PLC

(57) ABSTRACT

A collision performance evaluation test with few variations in test results with high accuracy in which a complicated phenomenon that actually occurs can be reproduced in a simple manner by considering the history of deformation in both the press forming and a collision. A collision performance evaluation test method for a metal sheet material for an automobile body is characterized in that a press working apparatus first forms a flat test specimen made of a metal sheet material to be tested into a V shape by primary bending, a bending test apparatus then deforms, by second- (Continued)

ary bending, the test specimen formed by the primary bending in a direction intersecting with the primary bending direction, and a bending load and a bending stroke for the test specimen during the secondary bending deformation are recorded and evaluated.

20 Claims, 11 Drawing Sheets

(51) Int. Cl.
  *G01N 3/06* (2006.01)
  *G01N 3/24* (2006.01)
  *G01N 3/307* (2006.01)

(52) U.S. Cl.
  CPC ....... *G01N 3/068* (2013.01); *G01N 2203/001* (2013.01); *G01N 2203/0023* (2013.01); *G01N 2203/0067* (2013.01); *G01N 2203/0282* (2013.01)

(58) Field of Classification Search
  CPC .............. G01N 2203/0023; G01N 2203/0067; G01N 2203/0282; G01N 2203/0647; G01M 17/0078
  USPC ........................................................ 73/849
  See application file for complete search history.

(56) References Cited

U.S. PATENT DOCUMENTS

| | | | |
|---|---|---|---|
| 10,189,128 B2 * | 1/2019 | Denkmeier | B23Q 7/046 |
| 11,060,961 B2 * | 7/2021 | Jeong | G01N 3/28 |
| 2003/0185430 A1 * | 10/2003 | Theobald | G06T 7/0004 |
| | | | 382/141 |
| 2013/0006543 A1 | 1/2013 | Hiwatashi et al. | |
| 2017/0191916 A1 * | 7/2017 | Aegerter | G01N 3/08 |
| 2018/0067028 A1 * | 3/2018 | Jelokhani Niaraki | G01N 3/28 |
| 2019/0184440 A1 * | 6/2019 | Shah | G01B 11/02 |
| 2020/0103322 A1 * | 4/2020 | Regimand | G01N 3/08 |
| 2021/0341366 A1 * | 11/2021 | Wu | G01N 3/32 |
| 2023/0105443 A1 * | 4/2023 | Sakaidani | G01N 3/04 |
| | | | 73/849 |

FOREIGN PATENT DOCUMENTS

| | | | | |
|---|---|---|---|---|
| EP | 3016009 A1 * | 5/2016 | | G01N 3/20 |
| JP | H11-006827 A | 1/1999 | | |
| JP | 2000-176549 A | 6/2000 | | |
| JP | 2006-056387 A | 3/2006 | | |
| JP | 2007-285832 A | 11/2007 | | |
| JP | 2014-085250 A | 5/2014 | | |
| JP | 2014-224761 A | 12/2014 | | |
| JP | 2016-080464 A | 5/2016 | | |
| KR | 10-2011-0098156 A | 9/2011 | | |
| KR | 20220026877 A * | 2/2022 | | |
| WO | 2011/126058 A1 | 10/2011 | | |

OTHER PUBLICATIONS

P. Dietsch et al.; "Methodology to assess fracture during crash simulation: fracture strain criteria and their calibration"; Metallurgical Research & Technology; 2017; vol. 114; No. 607; pp. 1-9.

Mar. 3, 2020 International Search Report issued in International Patent Application No. PCT/JP2019/049189.

Jun. 1, 2022 Office Action issued in Korean Patent Application No. 10-2021-7016620.

Aug. 22, 2023 Office Action issued in Chinese Patent Application No. 201980083344.4.

* cited by examiner

FIG. 5(a)
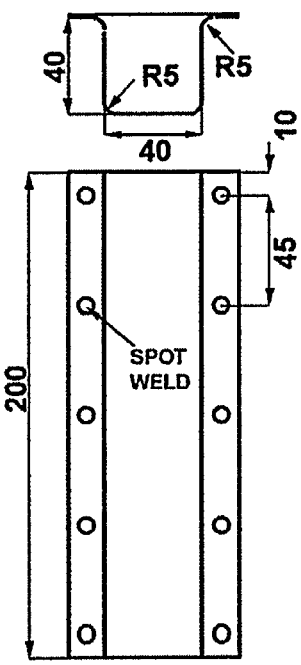
FIG. 5(b)
FIG. 6
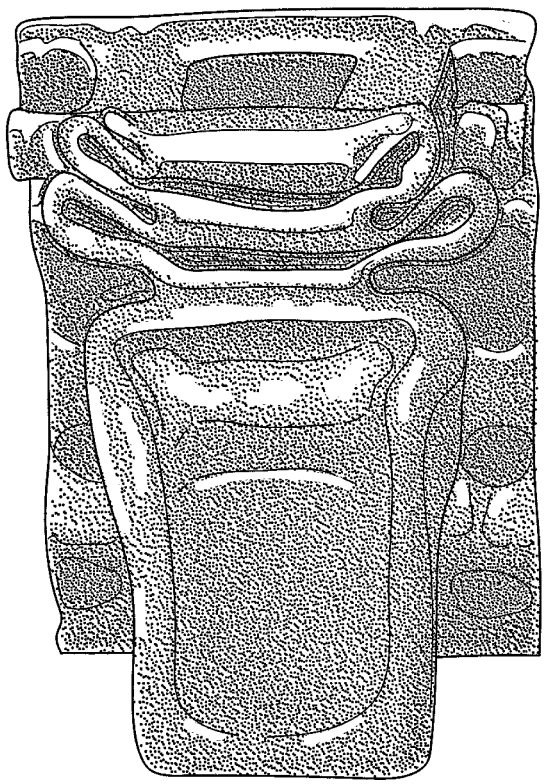

METHOD AND FACILITY FOR COLLISION PERFORMANCE EVALUATION TEST FOR METAL SHEET MATERIAL FOR AUTOMOBILE BODY

TECHNICAL FIELD

The present invention relates to a method and a facility for performing a collision performance evaluation test of a metal sheet material for an automobile body.

BACKGROUND ART

One of essential requirements for the automobile body is a collision performance, which is required to protect the occupants while reducing damage to the body in collision. To respond the recent needs for weight reduction of the automobile body, high-strength metal sheet materials, such as high-strength steel sheets, that are advantageous to collision properties and weight reduction are increasingly used. However, as the strength of a material increases, the ductility of the material decreases, so that the risk of occurrence of a fracture or crack development in collision increases.

In particular, the front side member and the rear side member arranged on the front and the rear of the automobile body are required to have a function of being plastically deformed and thereby absorbing the energy of the collision to reduce the impact on the automobile occupants in collision. From the viewpoint of the efficiency of collision energy absorption, the axial compression deformation, in which the part is deformed in a bellows-like state, is the most effective for absorbing the collision energy. However, the axial compression deformation locally occurs, so that a great amount of plastic strain occurs in the material and often exceeds the ductility limit of the material to cause a fracture. In particular, a catastrophic fracture may occur in a high-strength steel sheet having a strength exceeding 980 MPa, and the automobile body may fail to absorb the collision energy, which is a major problem in applying the high-strength steel sheet to the automobile body.

Typically, the ductility of a metal sheet material is evaluated using indexes such as uniform elongation or local elongation obtained by a tension test. However, a fracture often occurs in collision even in a material having high index values of these indexes. For development and selection of more appropriate material, various material test methods that can determine the presence or absence of fracture occurrence in collision have been proposed.

For example, a VDA 238-100 bending test method standardized by the German Association of the Automobile Industry (Verband der Automobilindustreie: VDA) proposes a method in which a sheet material is bridged on two support rollers arranged side by side and is then bent by pressing with a sharp punch from above, and the limit bending radius of the sheet material is evaluated. It is reported that the limit bending radius obtained by using the method corresponds to a local deformation that occurs in collision.

Patent Literature 1 proposes improving the bending test method according to the VDA standard described above so that the cracking resistance of a part in collision is predicted by evaluating crack occurrence after the limit bending radius is reached from a load-stroke curve obtained by experiment.

CITATION LIST

Patent Literature

Patent Literature 1: JP-A-2016-080464

SUMMARY OF INVENTION

Technical Problem

The material test methods are required to be highly accurate and able to reproduce actual complex phenomena by a simple technique and provide results with less variation. Although attempts have been made to provide test methods that are simple as compared to conventional methods, actual phenomena have not been able to be sufficiently reproduced.

To solve the above problems, the inventors have conducted a detailed experiment and analysis on the deformation state and the fracture occurrence state that occur during axial collapse of a part. Specifically, the inventors have performed a collapse test in the axial direction on a hat-shaped part having a back sheet formed of a high-strength steel sheet and classified the parts in which a fracture actually occurs, as described later. As a result, the inventors have found that most of the fractures occur in local bending deformation areas with high probability.

Next, the inventor has constructed a numerical model that can reproduce the deformation in the experiment and analyzed the deformation state of the fracture in detail, by a numerical simulation technique. Specifically, strain that occurs when the hat-shaped part is subjected a press working is first analyzed as shown in FIG. 7, and the axial collapse behavior of the hat-shaped part having a back sheet is then analyzed by advanced calculation as shown in FIG. 8. Note that reference symbol S denotes a strained portion, and reference symbol CS denotes a strain-concentrated portion.

The deformation of the portion where cracking occurs in the experiment is time-sequentially analyzed. As shown partly enlarged in FIG. 9, the analysis result has revealed that a corner portion (fillet portion) formed by bending in the press working is first flattened at the time of the collapse in the axial direction (FIGS. 9(a) to 9(c)), and bending deformation occurs in an intersecting and inverting direction with respect to the strain direction, leading to fracture in the local bending area (FIGS. 9(d) to 9(f)). From the study, the inventors have found that it is important to consider the history of deformation in the press working and the history of deformation in collision in order to evaluate fracture occurring in collision.

The metal sheet material for an automobile body, in particular, the steel sheet, is rarely used as it is, and is always used after being formed into the shape of a part by secondary forming such as press working. As not considering the history of deformation in the press forming and a collision, the conventional test methods are inadequate for evaluating fracture occurring in collision.

In view of above, an object of the present invention is to provide a collision performance evaluation test method and a collision performance evaluation test facility for a metal sheet material for an automobile body that advantageously can solve the problems of the conventional test methods described above.

Solution to Problem

A collision performance evaluation test method for a metal sheet material for an automobile body according to the present invention that attains the object is a test method for evaluating the collision performance of a metal sheet material for an automobile body, in which a press working apparatus first forms a flat test specimen made of a metal sheet material to be tested into a V shape by primary bending, a bending test apparatus deforms the test specimen that has been formed by the primary bending in a direction intersecting with a primary bending direction, by secondary bending, and a bending load and a bending stroke for the test specimen are recorded and evaluated during the secondary bending deformation.

A collision performance evaluation test facility for a metal sheet material for an automobile body according to the present invention that attains the object is characterized by including a press working apparatus that forms a flat test specimen made of a metal sheet material to be tested into a V shape by primary bending and a bending test apparatus that deforms the test specimen that has been formed by the primary bending in a direction intersecting with a primary bending direction, by secondary bending, and outputs a bending load and a bending stroke for the test specimen during the secondary bending deformation.

Advantageous Effects of Invention

With a collision performance evaluation test method and a collision performance evaluation test facility for a metal sheet material for an automobile body according to the present invention, a press working apparatus first forms a flat test specimen into a V shape by primary bending, then a bending test apparatus deforms, by secondary bending, the test specimen formed by the primary bending in a direction intersecting with a primary bending direction, and a bending load and a bending stroke for the test specimen are recorded and evaluated during the secondary bending deformation. Therefore, a complicated phenomenon that actually occurs can be reproduced in a simple manner by considering histories of deformation in both a press forming and a collision, whereby the collision performance evaluation test can be performed with high precision with reduced variations in test results.

In the collision performance evaluation test method and the collision performance evaluation test facility for a metal sheet material for an automobile body according to the present invention, the bending test apparatus may deform, by secondary bending, the test specimen that has been formed by the primary bending in an intersecting and also inverting direction with respect to the primary bending direction, and a bending load and a bending stroke for the test specimen may be recorded and evaluated during the secondary bending deformation.

Further, in the collision performance evaluation test method and the collision performance evaluation test facility for a metal sheet material for an automobile body according to the present invention, the metal sheet material to be tested may be a steel sheet, preferably, a high-strength steel sheet having a strength of not less than 980 MPa, and the bending test apparatus may be a bending test apparatus used for a bending test method according to the VDA 238-100 standard.

Furthermore, in the collision performance evaluation test method for a metal sheet material for an automobile body according to the present invention, deformation states of the test specimen being deformed during the secondary bending deformation may be continuously shot with a camera, and a fracture occurrence process may be analyzed based on the shot images. In the collision performance evaluation test facility for a metal sheet material for an automobile body according to the present invention, the bending test apparatus may have a camera that continuously shoots the deformation states of the test specimen during the secondary bending deformation and outputs the shot images.

BRIEF DESCRIPTION OF DRAWINGS

FIGS. 5(a) and 5(b) are an end view and a plan view, respectively, of a hat-shaped part with a back sheet for an automobile body made of the same material as the material tested in the collision performance evaluation test method for a metal sheet material for an automobile body of the embodiment with the collision performance evaluation test facility for a metal sheet material for an automobile body of the embodiment.

FIG. 6 is a photograph showing the hat-shaped part with a back sheet for an automobile body shown in FIG. 5 after an axial collapse test when viewed from diagonally above.

DESCRIPTION OF EMBODIMENTS

Figure 1:
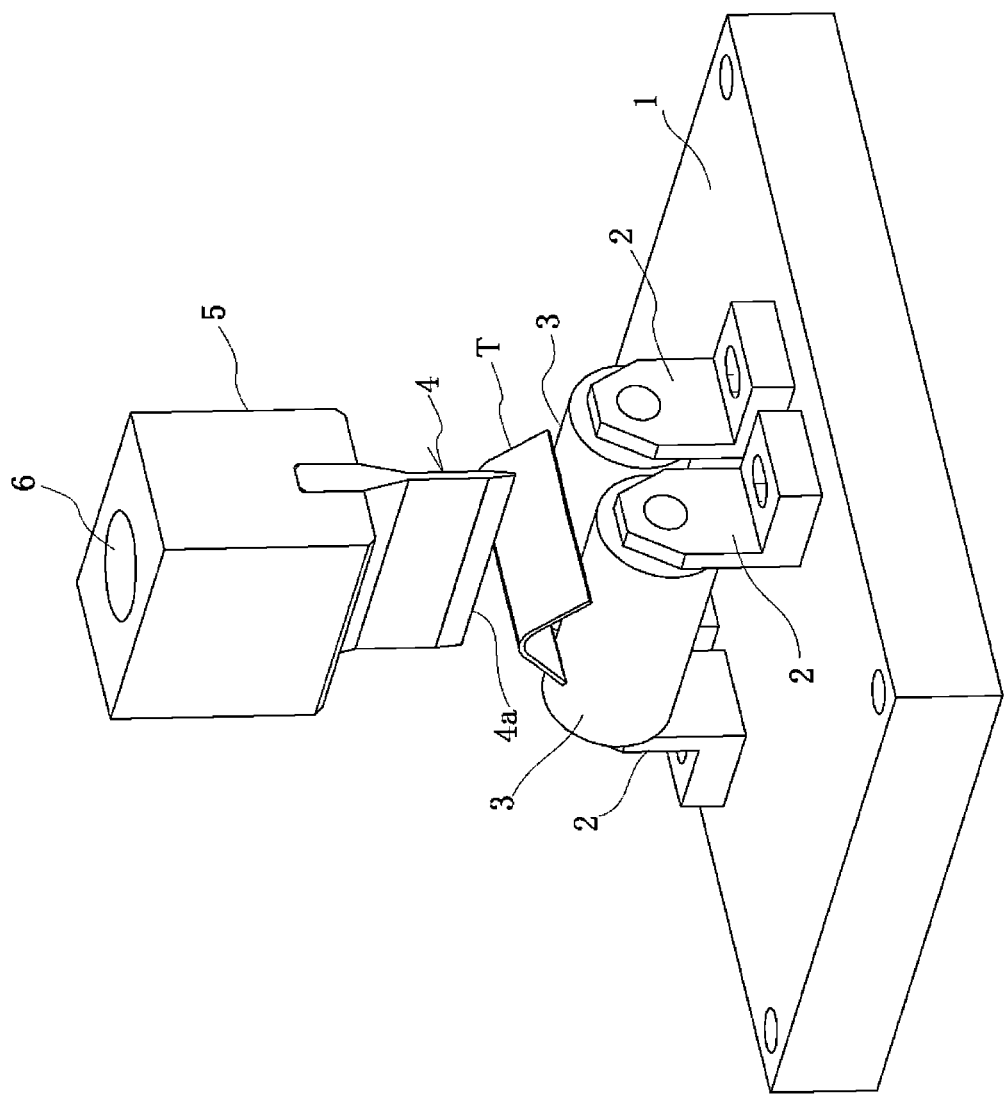
FIG. 1 is a perspective view of a bending test apparatus that configures a collision performance evaluation test facility for a metal sheet material for an automobile body of an embodiment according to the present invention, which is used for a collision performance evaluation test method for a metal sheet material for an automobile body of an embodiment according to the present invention.
Figure 2A:
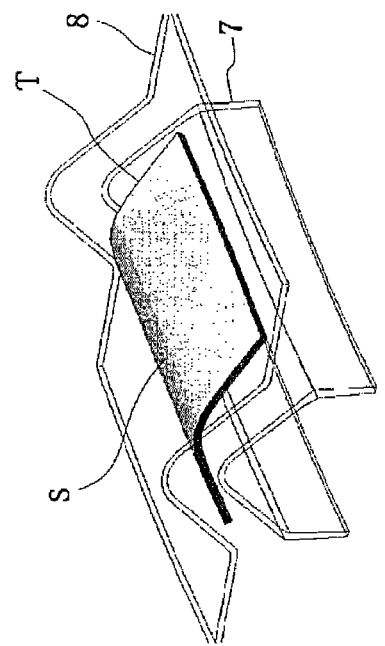
FIGS. 2(a) to 2(d) are diagrams sequentially showing a primary bending process of a test specimen in the collision performance evaluation test method for a metal sheet material for an automobile body of the embodiment.
Figure 2B:
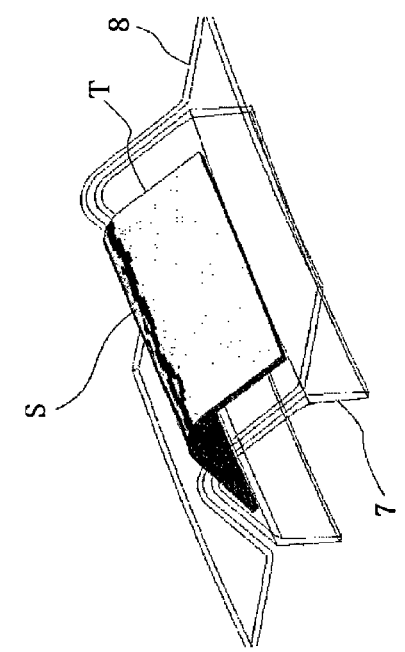
Figure 2C:
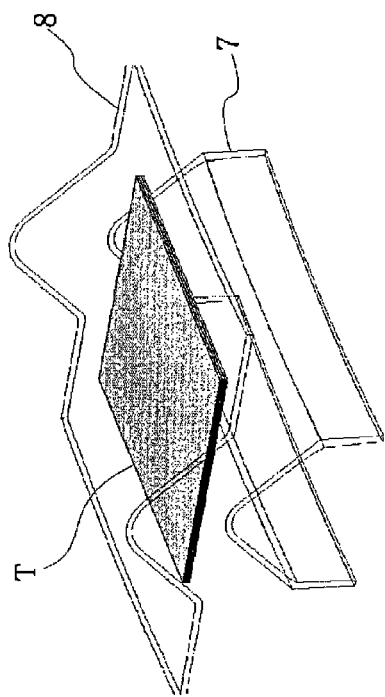
Figure 2D:
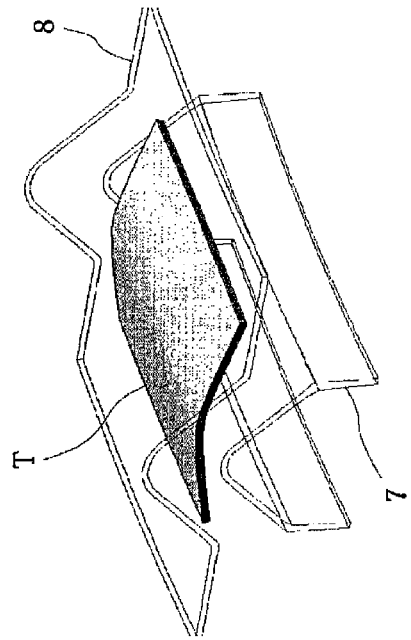

There will be described embodiments of the present invention in the following in detail with reference to the drawings. FIG. 1 is a perspective view of a bending test apparatus that configures a collision performance evaluation test facility for a metal sheet material for an automobile body according to an embodiment of the present invention, which is used for a collision performance evaluation test method for a metal sheet material for an automobile body according to an embodiment of the present invention.

The bending test apparatus configuring the collision performance evaluation test facility for a metal sheet material for an automobile body according to the embodiment is intended to perform a secondary bending test for a high strength steel sheet used as a metal sheet material configuring a part of an automobile body on a test specimen formed into a V shape by primary bending as described later, rather than on a flat test specimen, according to the VDA 238-100 bending test method. As shown in FIG. 1, the bending test apparatus includes two support rollers 3 that are horizontally arranged with a gap therebetween and each rotatably supported at the axial ends thereof by two pairs of bearings 2 that are arranged and fixed on a base 1 to be opposed to each other, a bending blade 4 serving as a punch supported such that a tip edge portion 4a thereof extends in parallel with the axes of the two support rollers 3 at the central position between the axes of the two support rollers 3, a bending blade holder 5 that holds the bending blade 4 so as to vertically extend, a load cell 6 that is provided on the bending blade holder 5 and detects and outputs a reaction force of a test specimen T in response to a bending deformation load downwardly applied by the bending blade 4 to the test specimen T, and a positioning jig (not shown) that abuts against an edge portion of the test specimen T to position the test specimen T at a predetermined position on the two support rollers 3 such that the bend formed by the primary bending faces upward.

The bending test apparatus compliant with the regulations of the VDA 238-100 bending test method has the base 1 that is attached to a pedestal of a common compression test machine or pressing apparatus (not shown), and the bending blade holder 5 that is attached to a slide driven by a hydraulic cylinder, for example, of the compression test apparatus. The slide is raised and lowered with respect to the pedestal, thereby raising and lowering the bending blade 4 between a standby position where the tip edge portion 4a is positioned above the two support rollers 3 and a lowered position where the tip edge portion 4a is positioned in the gap between the two support rollers 3. In this way, the bending test apparatus can achieve the secondary bending deformation of the test specimen described later.

That is, the collision performance evaluation test method for a metal sheet material for an automobile body according to the embodiment is characterized in that: a test specimen T made of a steel sheet that has been formed by primary bending into a V shape by press working from a flat state with a pressing apparatus is deformed, using the bending test apparatus compliant with the VDA 238-100 standard, by secondary bending in an intersecting, preferably perpendicular, and inverting direction with respect to the bending direction by primary bending; the bending load to the test specimen T during the secondary bending deformation is detected by the load cell 6 as the reaction force from the test specimen T; a bending stroke of the bending blade 4 during the secondary bending deformation is detected by the compression test machine described above as the amount of raising or lowering of the slide; and data on the bending load and the bending stroke is recorded with time.

According to the collision performance evaluation test method for a metal sheet material for an automobile body according to the embodiment, a plastic strain that causes fracture damage can be applied to the test specimen in a simple manner by the primary bending, which simulates the press working process. Also, using the bending test apparatus compliant with the VDA 238-100 standard, a secondary bending deformation is applied to the resulting V-shaped test specimen to thereby flatten the corner portion formed by the primary bending and cause bending deformation on the corner portion in the intersecting and inverting direction. Thus, a phenomenon in which an actual part locally causes fracture at a bend can be reproduced with a test specimen.

The collision performance evaluation test method for a metal sheet material for an automobile body according to the embodiment uses a facility including a common bending die and a bending test apparatus used for the VDA 238-100 standard, and the test machine that operates the bending test apparatus can be a common compression test machine. Therefore, the collision performance evaluation test method is highly economical. A test specimen with even a small area of about 50 mm square can be tested, and also a prototype material developed at the laboratory level can be evaluated. Therefore, the collision performance evaluation test method according to the embodiment can precisely predict the collision resistance properties of a steel sheet in a simple manner.

Specifically, in the collision performance evaluation test method for a metal sheet material for an automobile body according to the embodiment, a test specimen T made of a flat steel sheet is subjected to a primary bending, which corresponds to the press working of an automobile body part as a first step, in which the primary bending can use a common V-bending die and the test specimen T with a size of 50 mm×50 mm is prepared by shearing.

FIGS. 2(a) to 2(d) are diagrams sequentially showing the primary bending process for the test specimen T, with the V-bending die shown in perspective. In FIGS. 2(a) to 2(d), reference numeral 7 denotes a V-bending punch, reference numeral 8 denotes a V-bending die, and reference symbol S denotes a strained portion. A bending R can be adjusted to the actual automobile body part, although the bending R is typically adjusted within a range from R5 to R10 (from a bend radius of 5 mm to a bend radius of 10 mm). Although the bending angle is also desirably adjusted to the shape of the actual automobile body part, the bending angle is typically set within a range from 60° to 90°. The test specimen T formed by the primary bending has a tensile strain in the outer side of the bending and a compressive strain in the inner side of the bending toward the circumferential direction of the bending R portion.

In the second step, a secondary bending deformation is applied to the test specimen T that has been formed into a V shape by the primary bending in the first step. FIGS. 3(a) to 3(d) are diagrams sequentially showing the secondary bending deformation process for the test specimen in the collision performance evaluation test method for a metal sheet material for an automobile body according to the embodiment, with the bending test apparatus shown in perspective. In FIGS. 3(a) to 3(d), reference numeral 3 denotes a support roller, reference numeral 4 denotes a bending blade, reference symbol S denotes a strained portion, and reference symbol CS denotes a strain-concentrated portion. Although a bending test prescribed in the VDA 238-100 standard using the bending test apparatus described above is recommendable for the secondary bending deformation, other bending tests can be used. In the example shown in the drawings, the test specimen T is placed on the support rollers 3 in such a manner that the ridge of the bend formed in the first step described above is perpendicular to the tip edge portion 4a of the bending blade 4, and the test specimen T is bent from above the bend.

Figure 3A:
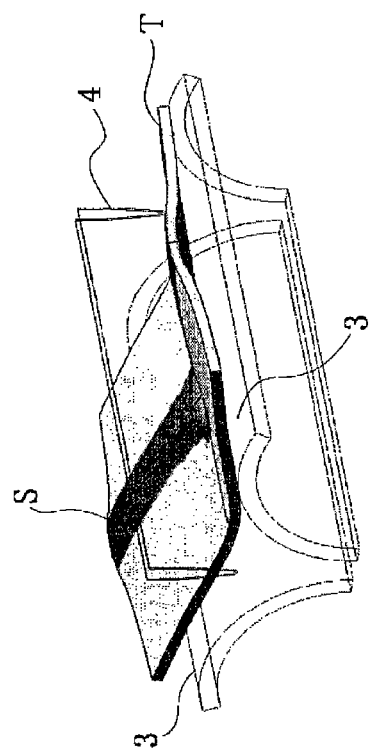
FIGS. 3(a) to 3(d) are diagrams sequentially showing a secondary bending deformation process of the test specimen in the collision performance evaluation test method for a metal sheet material for an automobile body of the embodiment.
Figure 3C:
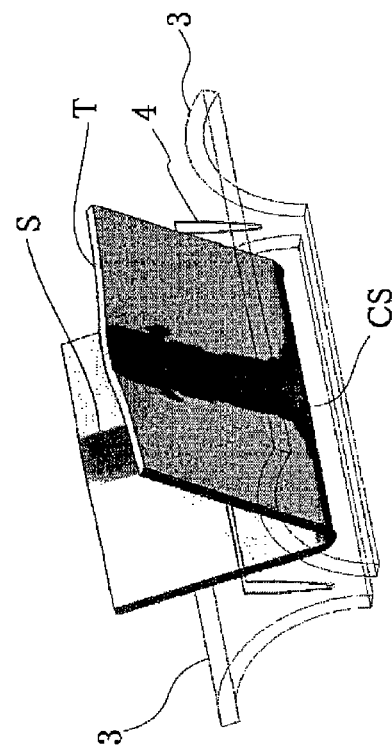
Figure 3B:
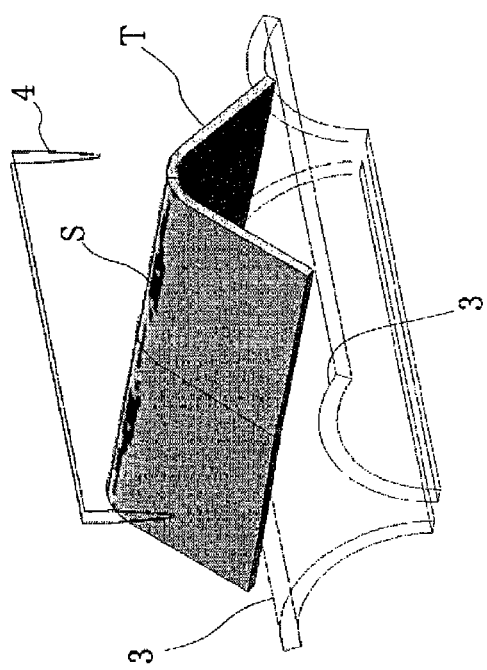
Figure 3D:
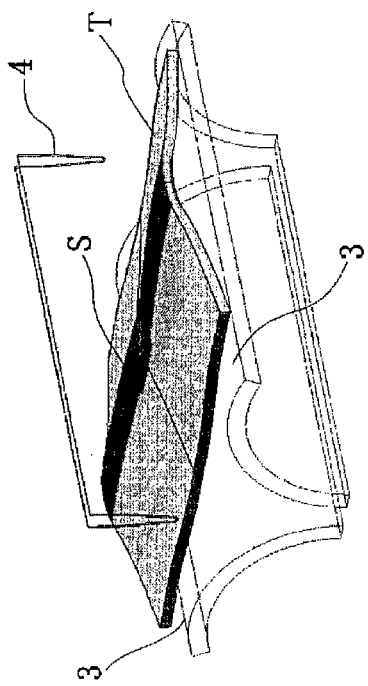

In the second step, the test specimen T that has been formed into a V shape is first deformed so that the bend is flattened as shown in FIGS. 3(a) and 3(b). After that, as shown in FIGS. 3(c) and 3(d), as the bending blade 4 serving as a punch is pushed into a gap between the support rollers 3, the test specimen T is subjected to bending in a perpendicular also inverting direction with respect to the direction of the strain introduced in the previous first step. Thereafter, as the deformation further proceeds, the strain is concentrated in the central portion of the test specimen T, and the strain-concentrated portion CS eventually causes fracture.

Figure 4:
FIG. 4 is a graph showing an example of a relationship between a punch load and a punch stroke measured in the secondary bending deformation process of the test specimen in the collision performance evaluation test method for a metal sheet material for an automobile body of the embodiment.
Figure 7:
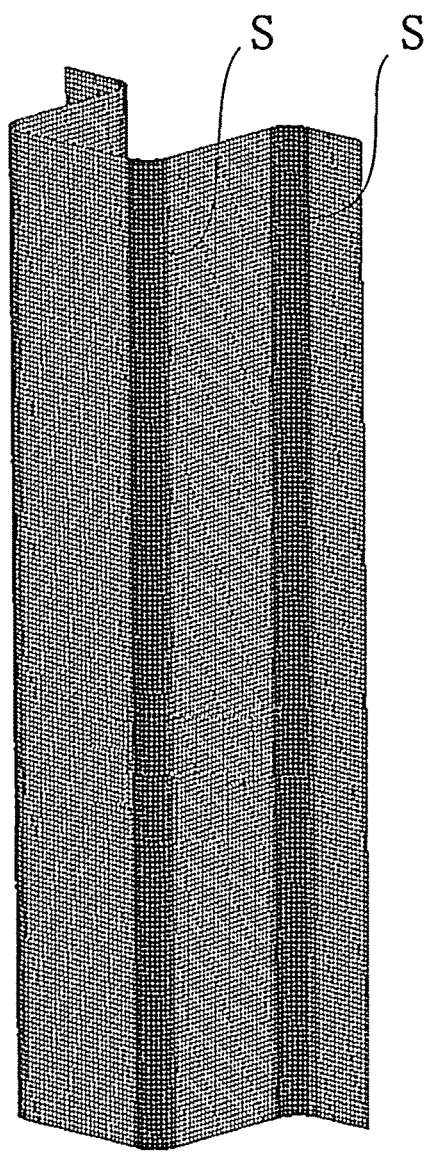
FIG. 7 is a perspective view showing a result of an FEM simulation of the primary bending process for the same hat-shaped part with a back sheet for an automobile body as that shown in FIG. 5(a) performed for verifying the collision performance evaluation test method and the collision performance evaluation test facility for a metal sheet material for an automobile body according to the embodiment, in which the shape of the hat-shaped part after the primary bending is shown without the back sheet.
Figure 8:
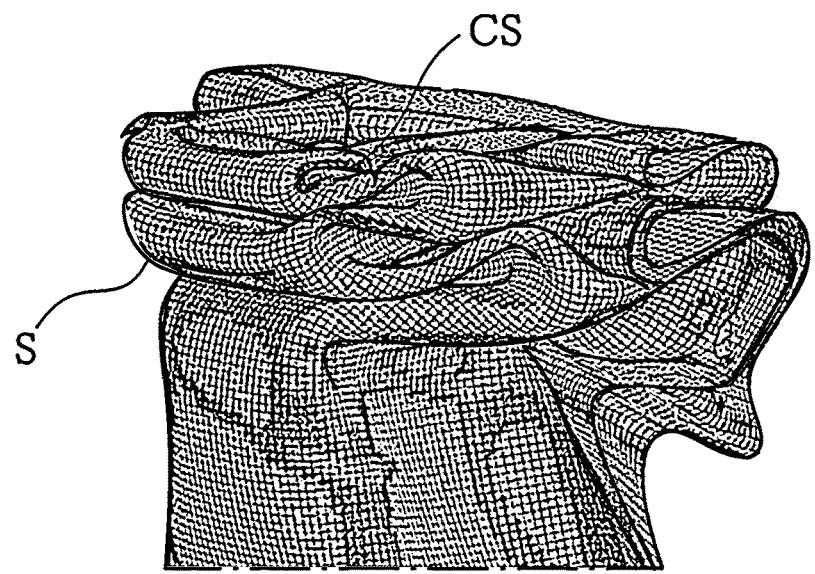
FIG. 8 is a perspective view showing a result of an FEM simulation of the secondary bending deformation process for the same hat-shaped part with a back sheet for an automobile body as that shown in FIG. 5(a), in which the shape of the hat-shaped part after the secondary bending deformation is shown.
Figure 9A:
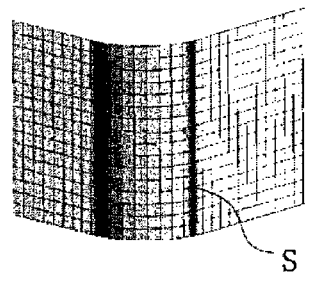
FIGS. 9(a) to 9(c) are enlarged views sequentially showing flattening deformation states of a corner portion in an FEM simulation of the secondary bending deformation process for the hat-shaped part with a back sheet for an automobile body shown in FIG. 8, and FIGS. 9(d) to 9(f) are enlarged views sequentially showing subsequent deformation states of the corner portion by bending in the inverting direction.
Figure 9B:
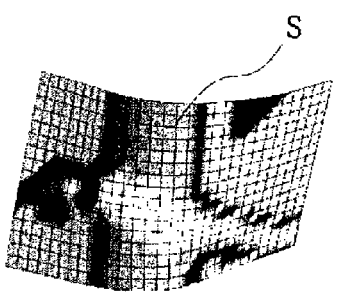
Figure 9C:
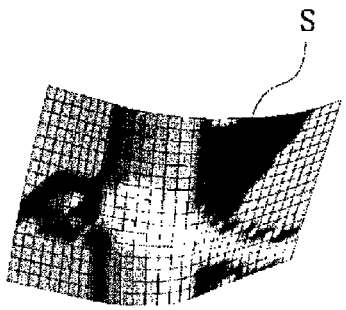
Figure 9D:
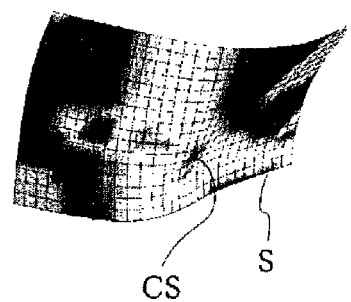
Figure 9E:
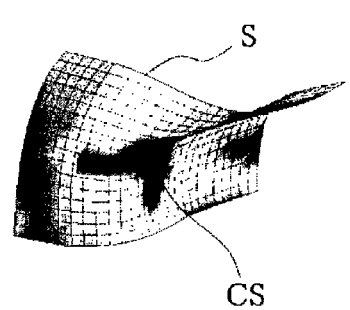
Figure 9F:
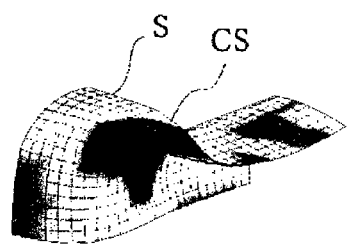

Data indicating a relationship between a punch load (Force) and a punch stroke (Stroke) in this process is recorded by a recording apparatus (not shown), which is configured by, for example, a personal computer or the like, and the recording apparatus outputs a stroke-load curve, such as the curve illustrated in FIG. 4. In the stroke-load curve, a point P where the punch load reaches a peak value is a point where the test specimen T causes fracture, and the punch load rapidly decreases once the fracture occurs. The recording apparatus described above may be configured to determine a fracture stroke value (a stroke value at the point P) at which the inflection of the punch load changes from rising to falling, from a derivative of the punch load, and output the fracture stroke value. Furthermore, the recording apparatus may be configured to compare the fracture stroke value with a predetermined reference value, determine whether the steel sheet material should be used for the relevant part or not, and output the result of the determination.

Example 1

Based on the collision performance evaluation test method for a metal sheet material for an automobile body according to the embodiment, the fracture stroke of steel sheets having various properties is evaluated. First, a coiled material is sheared into test specimens T having a uniform size of 60 mm×60 mm. The edge faces of the test specimens T are machined to remove burrs or sheared surfaces.

In the first step, using the V-bending die, the test specimen T is held between the V-bending punch 7 on the upper side and the V-bending die 8 on the lower side, and bent by pressing with a press working apparatus (pressing machine) having a capacity of 50 tons. The bending R (radius) of the V-bending punch is set to 5 mm or 8 mm.

In the second step, a bending is performed using the bending test apparatus compliant with the VDA 238-100 standard described above. The gap between the support rollers 3 is adjusted to be a value calculated by (the sheet thickness×2+0.5) mm for each sheet thickness so that the test specimen T after the bending can be inserted in the gap between the two support rollers 3. The radius (punch R) of the tip edge portion of the bending blade 4 is 0.2 mm according to the VDA standard. Table 1 shows the result of this experiment. The peak load value in the load-stroke curve obtained in the second step is defined as a fracture point.

For verification, a hat-shaped part for an automobile body having a cross-sectional size of 40 mm×40 mm and a length of 200 mm as shown in the end view of FIG. 5(a) and the plan view of FIG. 5(b) is manufactured using the same steel sheet material as that used in the experiment described above, and a back sheet made of the same material is fixed to the flange portion of the hat-shaped part by spot welding to form a hat-shaped part with a back sheet having a closed cross-sectional structure. The hat-shaped part before the back sheet is fixed is formed using a press-brake system bending. Then, the hat-shaped part with a back sheet is subjected to an axial collapse test in which the hat-shaped part is pressed to be collapsed with a hydraulic high-speed deformation test machine at a velocity of 10 m/s with a stroke of up to 100 mm. FIG. 6 is a photograph showing the hat-shaped part shown in FIG. 5 after subjected to the axial collapse test viewed from diagonally upward direction. From the photograph, the presence or absence of a fracture locally occurred at a deformed portion when the hat-shaped part is the axially collapsed is confirmed, and the result is sorted out.

Table 1 shows a relationship between the fracture stroke in the collision performance evaluation test method for a metal sheet material for an automobile body according to the embodiment and the presence or absence of occurrence of a cracking in the axial collapse test described above. In the axial collapse test for the hat-shaped part with a back sheet, a fracture is caused in most of the materials. However, the hat-shaped parts with a back sheet made of the materials Nos. 2, 4, 5 and 14 are axially collapsed without causing fracture. The fracture stroke values of the test specimens of these materials when the hat-shaped parts with a back sheet made of which are axially collapsed are approximately not less than 34 mm. Thus, there is a high correlation between the fracture stroke value used as an evaluation index in the collision performance evaluation test method for a metal sheet material for an automobile body according to the embodiment and the presence or absence of occurrence of a fracture in the hat-shaped part.

TABLE 1

| No. | Material Strength level | Sheet thickness mm | Yield strength MPa | Tensile strength MPa | Elongation % | First step Bending R (mm) | Second step Fracture stroke (mm) | Presence or absence of collapse cracking in axial direction ○: No cracking occurs x: Cracking occurs |
|---|---|---|---|---|---|---|---|---|
| 1 | 980 | 1.2 | 700 | 1054 | 16.1 | 5 | 32.5 | x |
| 2 | 980 | 1.4 | 741 | 1034 | 14.7 | 5 | 35.3 | ○ |
| 3 | 980 | 1.6 | 656 | 1052 | 16.7 | 5 | 28.5 | x |
| 4 | 980 | 1.2 | 877 | 1065 | 17.9 | 5 | 37.8 | ○ |
| 5 | 980 | 1.4 | 839 | 1060 | 18.9 | 5 | 38.7 | ○ |
| 6 | 980 | 1.2 | 741 | 1043 | 22.7 | 5 | 28.8 | x |
| 7 | 1180 | 1.2 | 952 | 1238 | 12.1 | 5 | 30.0 | x |
| 8 | 1180 | 1.4 | 933 | 1235 | 12.6 | 5 | 29.4 | x |
| 9 | 1180 | 1.6 | 993 | 1231 | 12.0 | 5 | 27.7 | x |
| 10 | 1180 | 1.2 | 1095 | 1220 | 14.3 | 5 | 30.7 | x |
| 11 | 1180 | 1.4 | 1026 | 1271 | 12.8 | 5 | 30.8 | x |
| 12 | 1180 | 1.2 | 1068 | 1230 | 13.7 | 5 | 26.2 | x |
| 13 | 1180 | 1.4 | 951 | 1244 | 16.5 | 5 | 27.9 | x |
| 14 | 1320 | 1.2 | 1261 | 1406 | 6.0 | 8 | 34.7 | ○ |
| 15 | 1320 | 1.4 | 1175 | 1348 | 7.4 | 8 | 32.3 | x |
| 16 | 1320 | 1.6 | 1174 | 1353 | 7.5 | 8 | 23.9 | x |
| 17 | 1470 | 1.2 | 1319 | 1506 | 7.9 | 8 | 26.2 | x |
| 18 | 1470 | 1.6 | 1296 | 1522 | 7.5 | 8 | 27.9 | x |

Figure 10E:
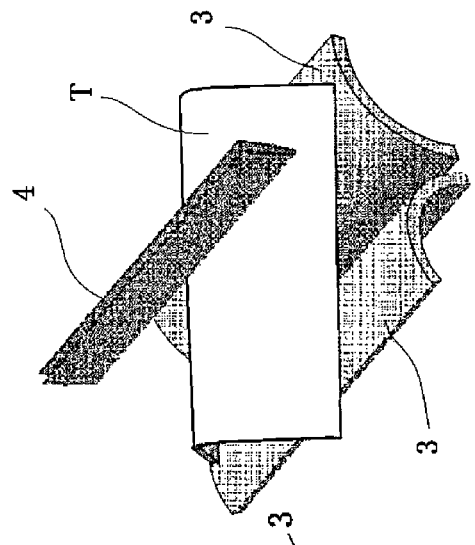
FIGS. 10(e) and 10(f) are diagrams for illustrating the state of a test specimen before and after bending deformation in a case where the bending angle is 60°.
Figure 10F:
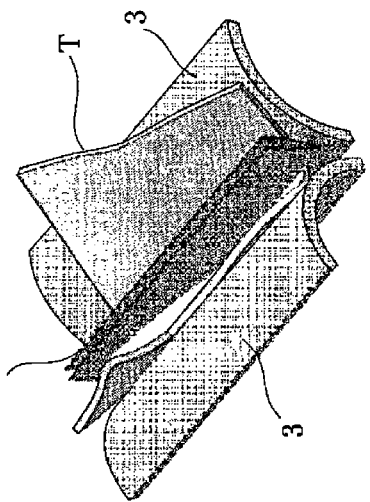
Figure 10C:
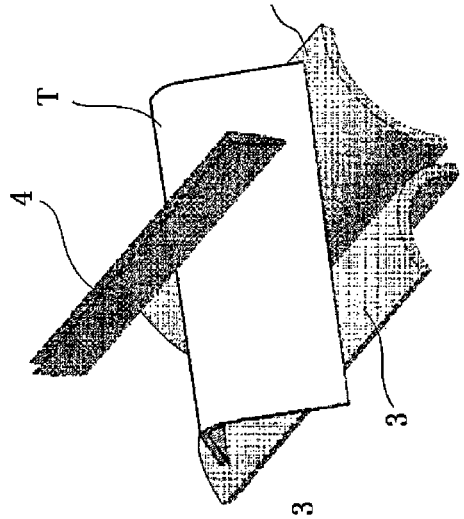
FIGS. 10(a) and 10(b) are diagrams for illustrating the state of a test specimen before and after bending deformation in the case where the bending angle is 90° shown in FIGS. 1 and 3, FIGS. 10(c) and 10(d) are diagrams for illustrating the state of a test specimen before and after bending deformation in a case where the bending angle is 70°.
Figure 10D:
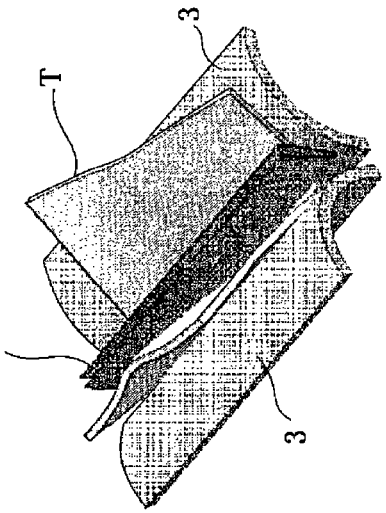
Figure 10A:
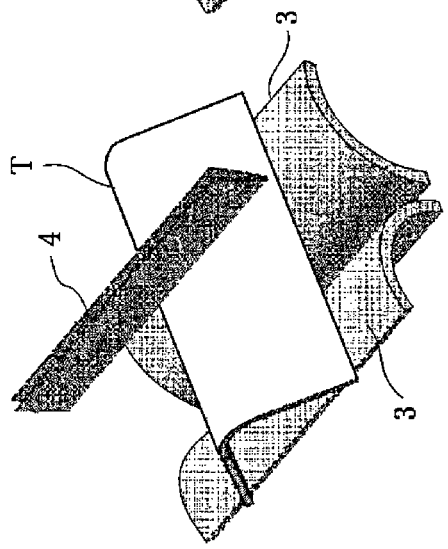
Figure 10B:
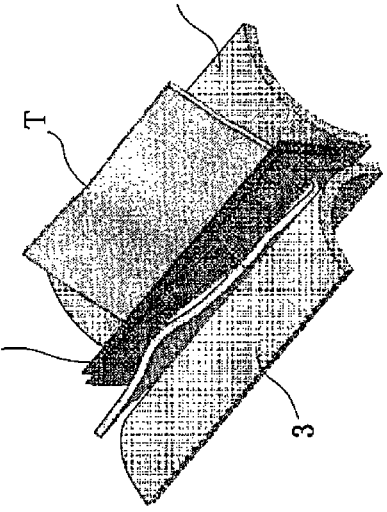

FIGS. 10(a) and 10(b) are diagrams for illustrating a test specimen before and after the bending deformation in the case where the angle of intersection is 90° shown in FIGS. 1 and 3, FIGS. 10(c) and 10(d) are diagrams for illustrating a test specimen before and after the bending deformation in the case where the angle of intersection is 70°, and FIGS. 10(e) and 10(f) are diagrams for illustrating a test specimen before and after the bending deformation in the case where the angle of intersection is 60°. As illustrated in these drawings, in the collision performance evaluation test method for a metal sheet material for an automobile body according to the present invention, when the bending test apparatus deforms the test specimen that has been formed in a V shape by primary bending, by secondary bending in an intersecting and inverting direction to the primary bending direction, the intersection angle of the bending blade 4 to the primary bending direction (extending direction of ridge) of the test specimen is not limited to 90°, but can be appropriately set depending on, for example, the location of the part made of the material for which the collision performance evaluation test is performed in the automobile body or deformation state of the part in collision, whereby a more appropriate evaluation can be made.

Figure 11:
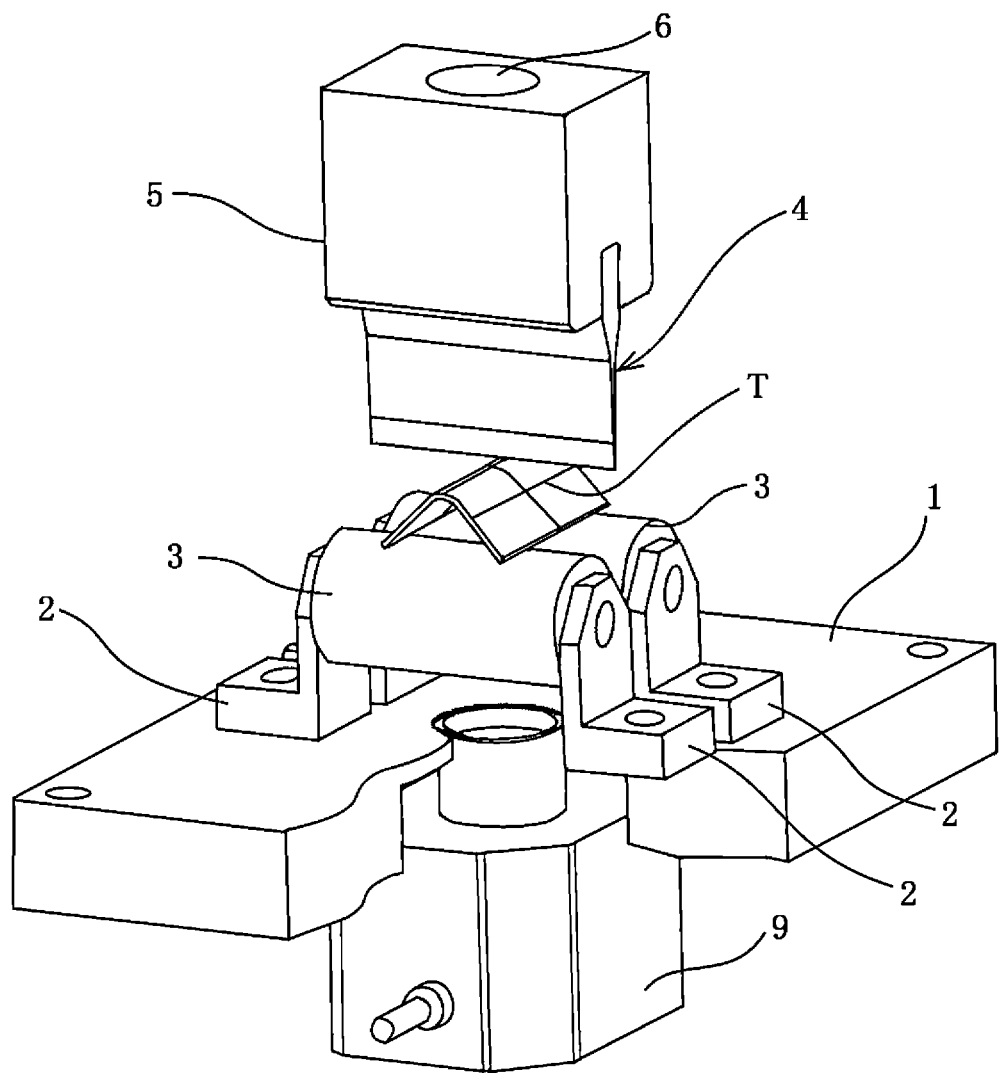
FIG. 11 is a perspective view of a bending test apparatus configuring a collision performance evaluation test facility for a metal sheet material for an automobile body according to another embodiment of the present invention, which is used for a collision performance evaluation test method for a metal sheet material for an automobile body according to another embodiment of the present invention.

FIG. 11 is a perspective view of a bending test apparatus configuring a collision performance evaluation test facility for a metal sheet material for an automobile body according to another embodiment of the present invention, which is used for a collision performance evaluation test method for a metal sheet material for an automobile body according to another embodiment of the present invention.

As with the bending test apparatus shown in FIG. 1, a bending test apparatus configuring the collision performance evaluation test facility for a metal sheet material for an automobile body according to the embodiment includes two support rollers 3 that are horizontally arranged with a gap therebetween, and each rotatably supported at the axial ends thereof by two pairs of bearings 2 that are arranged and fixed on a base 1 to be opposed to each other, a bending blade 4 serving as a punch supported such that a tip edge portion 4a thereof extends in parallel with the axes of the two support rollers 3 at the central position between the axes of the two support rollers 3, a bending blade holder 5 that holds the bending blade 4 so as to vertically extend, a load cell 6 that is provided on the bending blade holder 5 and detects and outputs a reaction force of a test specimen T in response to a bending deformation load downwardly applied by the bending blade 4 to the test specimen T, and a positioning jig (not shown) that abuts against an edge portion of the test specimen T to position the test specimen T at a predetermined position on the two support rollers 3.

Figure 12:
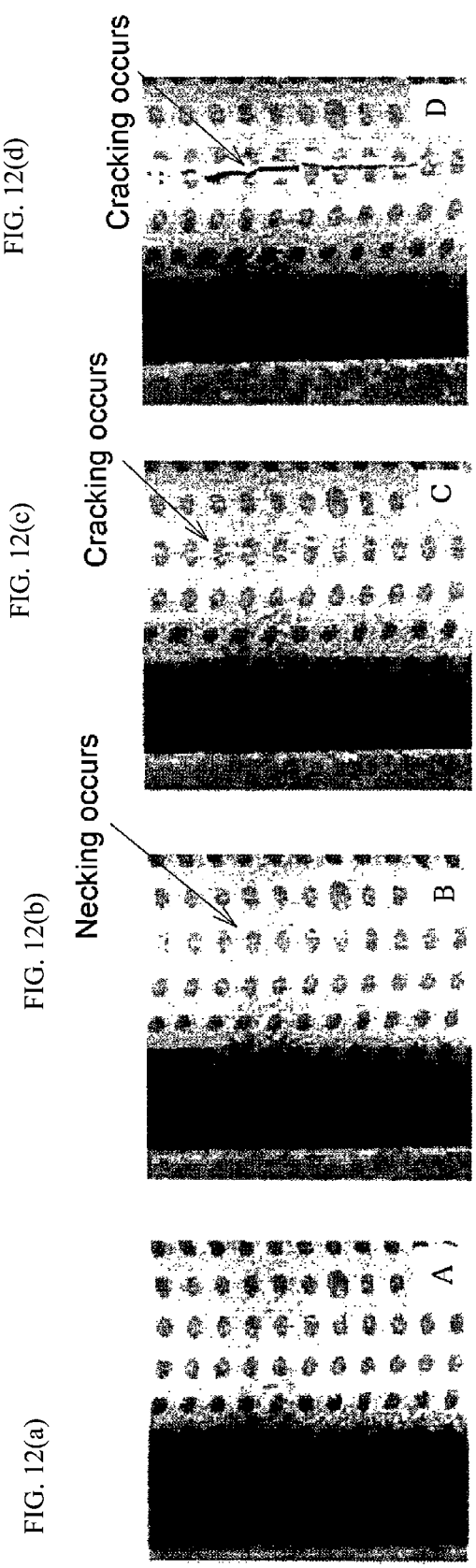
FIGS. 12(a) to 12(d) are diagrams sequentially showing extracted images of the test specimen being deformed by secondary bending in the collision performance evaluation test method for a metal sheet material for an automobile body according to the embodiment that are continuously taken with a camera.

In order to continuously take images of the test specimen T being deformed during the secondary bending deformation from between the two support rollers 3 when the test specimen T that has been formed into a V-shape by primary bending in the first step is deformed by secondary bending in the second step in the same manner as in the collision performance evaluation test method for a metal sheet material for an automobile body according to the embodiment described earlier, the bending test apparatus further has a through-hole formed in a central portion of the base 1 and, for example, a digital video camera 9 for motion picture shooting used for the continuous shooting, the digital video camera 9 being arranged below the base 1 with its imaging optical system aligned with the axis of the through-hole. The video camera 9 takes images of the test specimen T being deformed by secondary bending and outputs image data, which is recorded in a recording apparatus formed by a personal computer or the like as in the bending test apparatus shown in FIG. 1, and as illustrated in FIGS. 12 and 13, the recording apparatus outputs the images of the test specimen T on a screen of a display device (not shown), for example, in synchronization with the stroke-load curve for the test specimen T being deformed by secondary bending.

FIGS. 12(a) to 12(d) are diagrams sequentially showing some of the images of the test specimen T being deformed by secondary bending in the collision performance evaluation test method for a metal sheet material for an automobile body according to the embodiment that are continuously taken with the video camera 9. FIG. 13 is a graph showing an example of the relationship between the punch load and the punch stroke measured in the secondary bending deformation process for the test specimen T shown in FIG. 12. The material of the test specimen T is a high-strength steel sheet having a strength of 980 MPa used as a metal sheet material for an automobile body part and has a thickness of 1.2 mm.

Figure 13:
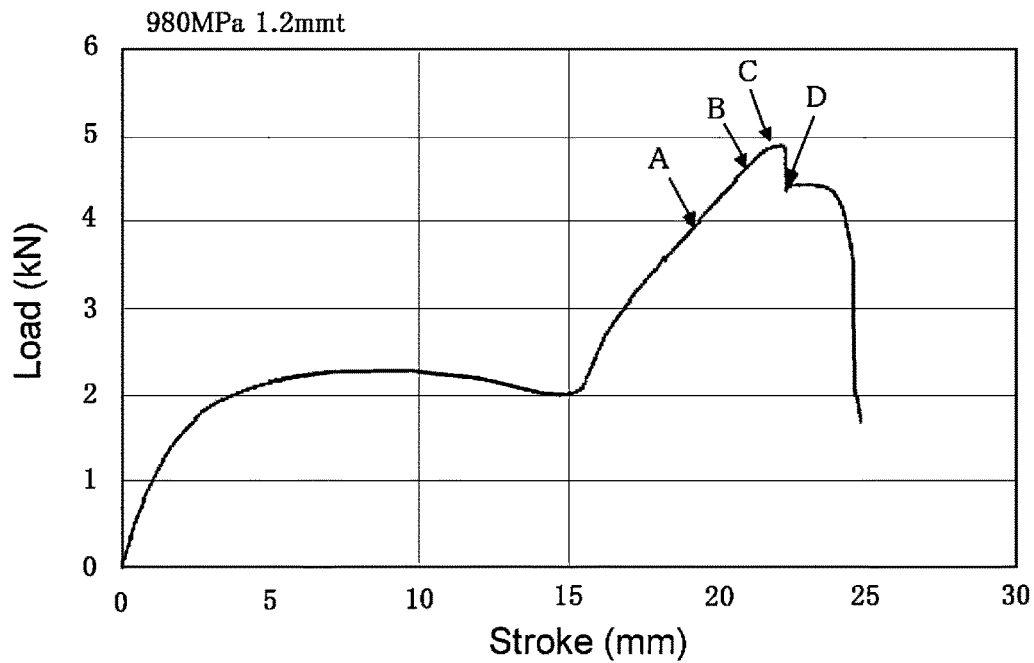
FIG. 13 is a graph showing an example of a relationship between a punch load and a punch stroke measured in the secondary bending deformation process for the test specimen in the collision performance evaluation test method for a metal sheet material for an automobile body according to the embodiment.

In the phase shown in FIG. 12(a) and by the arrow A in FIG. 13, no crack has occurred in the back face of the test specimen T. In the phase shown in FIG. 12(b) and by the arrow B in FIG. 13, no crack has occurred in the back face of the test specimen T while a necking has occurred in the front face along the tip edge of the bending blade 4. In the phase shown in FIG. 12(c) and by the arrow C in FIG. 13, a small crack has occurred in the back face of the test specimen T along the tip edge of the bending blade 4 on the front face side. In the phase shown in FIG. 12(d) and by the arrow D in FIG. 13, the crack in the back face of the test specimen T is developing.

Therefore, according to the collision performance evaluation test method for a metal sheet material for an automobile body according to the embodiment using the collision performance evaluation test facility for a metal sheet material for an automobile body according to the embodiment, the process of occurrence of a fracture including an elongation, a necking and occurrence and development of a crack during the secondary bending deformation process of the test specimen T can be analyzed in detail by comparing the data (FIG. 13) of the graph showing the relationship between the punch load (Force) and the punch stroke (Stroke) in the secondary bending deformation process for the test specimen T and the data (FIG. 12) of the images of the bent and deformed portion continuously taken with the video camera 9, and the critical fracture stroke can be more precisely evaluated.

Figure 14:
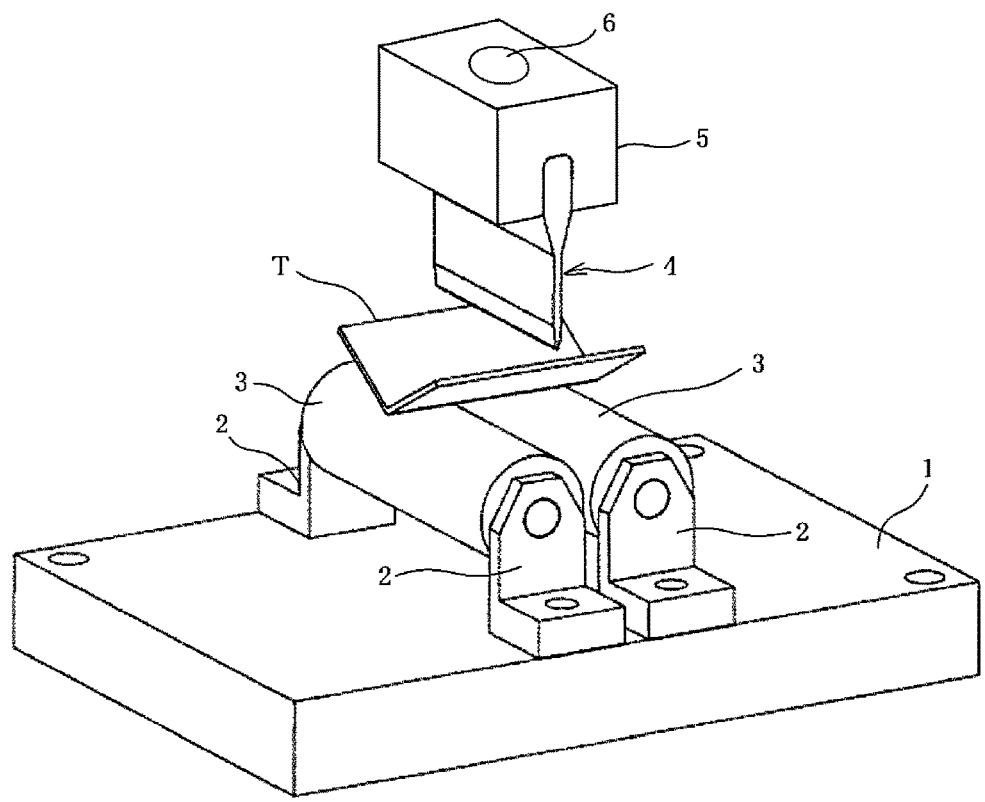
FIG. 14 is a perspective view of a bending test apparatus configuring a collision performance evaluation test facility for a metal sheet material for an automobile body according to still another embodiment of the present invention, which is used for a collision performance evaluation test method for a metal sheet material for an automobile body according to still another embodiment of the present invention.

FIG. 14 is a perspective view of a bending test apparatus configuring a collision performance evaluation test facility for a metal sheet material for an automobile body according to still another embodiment of the present invention, which is used for a collision performance evaluation test method for a metal sheet material for an automobile body according to still another embodiment of the present invention. In FIG. 14, the same parts as those in the embodiments described above are denoted by the same reference numerals.

That is, the bending test apparatus according to the embodiment also includes two support rollers 3 that are horizontally arranged with a gap therebetween, and each rotatably supported at the axial ends thereof by two pairs of bearings 2 that are arranged and fixed on a base 1 to be opposed to each other, a bending blade 4 serving as a punch supported such that a tip edge portion 4a thereof extends in parallel with the axes of the two support rollers 3 at the central position between the axes of the two support rollers 3, a bending blade holder 5 that holds the bending blade 4 so as to vertically extend, a load cell 6 that is provided on the bending blade holder 5 and detects and outputs a reaction force of a test specimen T in response to a bending deformation load downwardly applied by the bending blade 4 to the test specimen T, and a positioning jig (not shown) that abuts against an edge portion of the test specimen T to position the test specimen T at a predetermined position on the two support rollers 3.

With the bending test apparatus according to the embodiment, which is compliant with the VDA 238-100 standard, a test specimen T made of a steel sheet that has been previously formed into a V shape by primary bending from a flat state by press working with a pressing apparatus is placed on the support rollers 3 of the bending test apparatus such that the bend formed by the primary bending is faced downward. The bending test apparatus then deforms the test specimen T from above the bottom portion of the test specimen T by secondary bending in the intersecting direction, preferably perpendicular direction to the bending direction by the primary bending, and, different from the previous embodiment, not in the inverting direction with respect to the bending direction of the primary bending but in the same direction. The bending load on the test specimen T during the secondary bending deformation is detected by the load cell 6 as the reaction force from the test specimen T, and the bending stroke of the bending blade 4 during the secondary bending deformation is detected by the compression test machine described above as the amount of raising or lowering of the slide. Data on the bending load and the bending stroke is recorded with time by a recording apparatus (not shown) that is configured by, for example, a personal computer or the like, and is output for evaluation in the form of a graph or the like.

According to the collision performance evaluation test method for a metal sheet material for an automobile body according to the embodiment using the collision performance evaluation test facility for a metal sheet material for an automobile body according to the embodiment, as with the collision performance evaluation test method according to the previous embodiments, a complicated phenomenon that actually occurs can be reproduced in a simple manner by considering the history of deformation in both the press working and a collision, and the collision performance evaluation test can be performed with high precision with few variations in test results.

Although the present invention has been with regard to examples shown in the drawings, the present invention is not limited to the examples described above. For example, although the metal sheet to be tested is a high-strength steel sheet in the embodiments described above, a normal steel sheet or other sheet materials, such as an aluminum sheet, can also be tested instead of the high-strength steel sheet.

Although the bending test apparatus compliant with the VDA 238-100 standard is used as the bending test apparatus that deforms the test specimen by secondary bending in the direction intersecting with the primary bending direction in the embodiments described above, other arrangements, such as a pressing machine attached to a normal bending die, can also be used instead of the bending test apparatus.

Furthermore, as the camera for continuous shooting, for example, a digital still camera capable of high-speed continuous shooting or the like can be used instead of the video camera 9 to obtain images with a higher definition.

Furthermore, the bending test apparatus configuring the collision performance evaluation test facility for a metal sheet material for an automobile body shown in FIG. 14 may be combined with a camera as shown in FIG. 11.

INDUSTRIAL APPLICABILITY

With the collision performance evaluation test method and the collision performance evaluation test facility for a metal sheet material for an automobile body according to the present invention, a press working apparatus first forms a flat test specimen into a V shape by primary bending, and a bending test apparatus then deforms, by secondary bending, the test specimen formed by primary bending in a direction intersecting with the direction of the primary bending direction, and the bending load and the bending stroke for the test specimen during the secondary bending deformation are recorded and evaluated. Therefore, a complicated phenomenon that actually occurs can be reproduced in a simple manner by considering the history of deformation in both the press working and a collision, and the collision performance evaluation test can be performed with high precision with few variations in test results.

REFERENCE SIGNS LIST 1 base
2 bearing
3 support roller
4 bending blade
4a tip edge portion
5 bending blade holder
6 load cell
7 V-bending punch
8 V-bending die
9 video camera
T test specimen
CS strain-concentrated portion
S strained portion

The invention claimed is:

1. A collision performance evaluation test method for a metal sheet material for an automobile body, the method comprising:
   first forming, by a press working apparatus, a flat test specimen made of a metal sheet material to be tested into a V shape having a curved portion by primary bending;
   deforming, by a bending test apparatus, the test specimen that has been formed by the primary bending in a direction intersecting with a primary bending direction and after the curved portion of the test specimen formed by the primary bending is flattened, by secondary bending; and
   recording and evaluating a bending load and a bending stroke for the test specimen during the secondary bending deformation, wherein
   the bending load and the bending stroke are recorded and evaluated such that a stroke-load curve is output including indication of a peak point of the bending load and a fracture stroke value corresponding to the peak point.

2. The collision performance evaluation test method according to claim 1, wherein
   the deforming is in a direction intersecting and inverting with respect to the primary bending direction.

3. The collision performance evaluation test method according to claim 2, wherein
   the metal sheet material to be tested is a high-strength steel sheet having a strength of not less than 980 MPa.

4. The collision performance evaluation test method according claim 3, wherein
   the bending test apparatus is a bending test apparatus used for a bending test method compliant with the VDA 238-100 standard.

5. The collision performance evaluation test method according claim 4, further comprising
   continuously shooting, with a camera, deformation states of the test specimen being deformed during the secondary bending deformation; and
   analyzing a fracture occurrence process based on the shot images.

6. The collision performance evaluation test method according to claim 3, further comprising
   continuously shooting, with a camera, deformation states of the test specimen being deformed during the secondary bending deformation; and
   analyzing a fracture occurrence process based on the shot images.

7. The collision performance evaluation test method according claim 2, wherein
   the bending test apparatus is a bending test apparatus used for a bending test method compliant with the VDA 238-100 standard.

8. The collision performance evaluation test method according to claim 2, further comprising
   continuously shooting, with a camera, deformation states of the test specimen being deformed during the secondary bending deformation; and
   analyzing a fracture occurrence process based on the shot images.

9. The collision performance evaluation test method according to claim 1, wherein
   the metal sheet material to be tested is a high-strength steel sheet having a strength of not less than 980 MPa.

10. The collision performance evaluation test method according to claim 1, wherein
    the bending test apparatus is a bending test apparatus used for a bending test method compliant with the VDA 238-100 standard.

11. A collision performance evaluation test facility for a metal sheet material for an automobile body, the collision performance evaluation test facility comprising:
    a press working apparatus that forms a flat test specimen made of a metal sheet material to be tested into a V shape having a curved portion by primary bending; and
    a bending test apparatus that deforms the test specimen that has been formed by the primary bending in a direction intersecting with a primary bending direction and after the curved portion of the test specimen formed by the primary bending is flattened, by secondary bending, and records and evaluates a bending load and a bending stroke for the test specimen during the secondary bending deformation, wherein
    the bending load and the bending stroke are recorded and evaluated such that a stroke-load curve is output including indication of a peak point of the bending load and a fracture stroke value corresponding to the peak point.

12. The collision performance evaluation test facility according to claim 11, wherein
    the bending test apparatus deforms, by the secondary bending, the test specimen that has been formed by the primary bending in an intersecting and also inverting direction with respect to the primary bending direction.

13. The collision performance evaluation test facility according to claim 12, wherein
    the metal sheet material to be tested is a high-strength steel sheet having a strength of not less than 980 MPa.

14. The collision performance evaluation test facility according to claim 13, wherein
    the bending test apparatus is a bending test apparatus used for a bending test method compliant with the VDA 238-100 standard.

15. The collision performance evaluation test facility according to claim 14, wherein
    the bending test apparatus has a camera that continuously takes images of the test specimen being deformed during the secondary bending deformation and outputs the taken images.

16. The collision performance evaluation test facility according to claim 13, wherein
    the bending test apparatus has a camera that continuously takes images of the test specimen being deformed during the secondary bending deformation and outputs the taken images.

17. The collision performance evaluation test facility according to claim 12, wherein
the bending test apparatus is a bending test apparatus used for a bending test method compliant with the VDA 238-100 standard.

18. The collision performance evaluation test facility according to claim 12, wherein
the bending test apparatus has a camera that continuously takes images of the test specimen being deformed during the secondary bending deformation and outputs the taken images.

19. The collision performance evaluation test facility according to claim 11, wherein
the metal sheet material to be tested is a high-strength steel sheet having a strength of not less than 980 MPa.

20. The collision performance evaluation test facility according to claim 11, wherein
the bending test apparatus is a bending test apparatus used for a bending test method compliant with the VDA 238-100 standard.

* * * * *